Patented Aug. 4, 1953

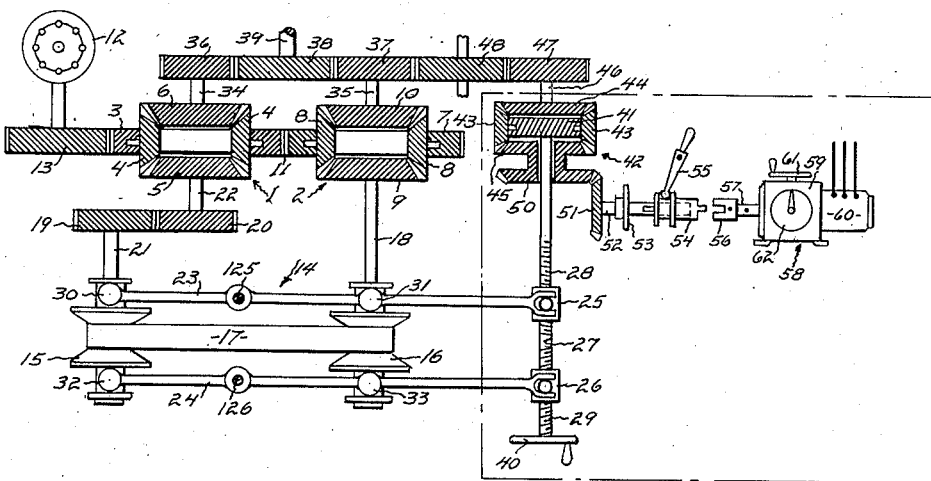

2,647,417

UNITED STATES PATENT OFFICE 2,647,417

DIFFERENTIAL GEARING POWER TRANSMISSION

Lev A. Trofimov, Willoughby, Ohio

Original application June 24, 1944, Serial No. 541,882. Divided and this application March 11, 1949, Serial No. 80,872

5 Claims. (Cl. 74—689)

This invention relates to power transmissions and particularly to power transmissions for transmitting to a load the power of a motor which runs continuously at full speed or at high-power efficient speed; the control of the transmitted speed being effected by control of the transmission as distinguished from control of the motor.

The invention is adaptable to drive loads which are to be started and driven at constant speed, or at variable speed, in one direction or in either the forward or the reverse direction, and brought to rest from either direction; and to loads of either the overhauling or the non-overhauling type; and to loads that are to be started and moved to a desired position and brought to rest in that position; and to moving loads that are to be quickly braked to stop them.

In general, the transmission comprises a double differential gearing, or pair of differential gearings, having gear elements driven by the motor; gear elements connected to the load or a load shaft to be driven; and gear elements the relative speed of which is controlled, to control the movement and speed of the load as aforesaid.

In my copending patent application Serial Number 541,882, filed June 24, 1944, when originally filed (now Patent 2,464,275, March 15, 1949), were illustrated and described and claimed several means or methods for controlling as aforesaid the relative speed of control gear elements of a double differential gearing. The subject matter of the present application has been divided out of said copending application, and as will be hereinafter described, and according to the present invention, the relative speed of said control gear elements of the double differential gearing is controlled by an adjustable variable-speed-ratio transmission interconnecting them; and various means are provided both manual and automatic to adjust the speed-ratio for various load control purposes as referred to above.

The objects of the invention therefore are to provide a transmission and control therefor having the load control features and mode of operation referred to above, and as more fully described hereinafter; the invention itself being set forth in the claims appended hereto.

The invention is fully disclosed in the following description taken in connection with the accompanying drawing, in which the single figure is a somewhat diagrammatic view illustrating an embodiment of the invention.

Referring to the drawing, there is shown a double differential gearing comprising two interconnected differential gears 1—2; the gearing 1 comprising a carrier or spider element 3 rotatably supporting pinions 4—4, meshed with differential gears 5—6; and the gearing 2 being similar, and preferably for the sake of resulting economies, identical, with the gearing 1, and comprising a spider 7, rotatably supporting pinions 8—8 meshed with differential gears 9—10.

In this embodiment of the invention, it is contemplated that the spider elements 3—7 are to rotate in opposite directions at equal speeds and to this end are of equal diameter and are provided with gear teeth on their outer peripheries meshed with each other as shown at 11; and in this embodiment it is contemplated that the motor power input is to be at the spiders 3—7, and accordingly a power supplying, continuously running motor 12 drives a gear 13 meshed with one of the spider elements 3—7, for example the spider element 3.

Indicated generally at 14 is an adjustable variable-speed-ratio transmission of the expansible-pulley and belt (or chain) type, commonly known as the "Reeves" type. In the diagrammatic showing, it comprises expansible pulleys 15—16 connected by a belt 17; the pulley 16 being connected to the differential gear 9; by a shaft 18; the pulley 15 being connected to the differential gear 5, through direction-reversing engaged gears 19—20; the gear 19 being connected to the pulley 15 by a shaft 21, and the gear 20 being connected to the differential gear 5 by a shaft 22. The gears 20—21 are preferably of equal diameter. The term "belt" as used in the claims is intend to be generic as to the several known species of belt such as one piece belts, chain belts made up of links, etc.

Levers 23—24 are mounted to be rocked on stationary pivots at 125—126 by means of travelling nuts 25—26 on reversely threaded portions 28—29 of a screw 27, the nuts 25—26 connected to the levers. On opposite sides of the pivots 125—126 the lever 23 has enlargements 30—31 and the lever 24 has enlargements 32—33, disposed in suitable grooves associated with the pulleys 15—16. By this means, when the screw 27 is rotated in one direction or the other, the nuts 25—26 will move toward or from each other and the levers 23—24 will be rocked oppositely on the pivots 125—126 and one pulley 15 or 16 will be expanded axially and have smaller belt engaging diameter and the other pulley will be contracted axially and have larger diameter.

For the illustrated intermediate position of the levers 23—24, the pulleys 15—16 will have equal diameters; and being connected by the belt 17 will be constrained to run at the same speed, or with a one-to-one speed ratio.

Motor power put in by the motor 13 at the spider elements 3—7, rotates them at equal speeds and in opposite directions and develops equal torques therein. The torques of the spider elements 3—7 respectively are transmitted equally to the gears 5—6 and 9—10. It will be assumed at this point that the belt pulleys 15—16 are of equal diameter as shown and that therefore the gears 5—9 are constrained to rotate or be driven at the same speed in opposite directions. The gears 6—10 tend to be driven in opposite directions by equal torques thereon. The gears 6—10 however are connected by shafts 34—35 to gears 36—37 which are both meshed with a gear 38 on the output shaft or load shaft 39 to which load not shown is connected. The torques in gears 36—37 are therefore applied equally and oppositely to gear 38 and the load shaft remains at rest.

In this balanced condition with the load shaft at rest, the gears 5—9 are driven in opposite directions and at equal speeds determined by the speed-ratio setting of the transmission 14, and at twice the speed of the spiders 3—7.

The load shaft 39 may have torque developed in it to drive and rotate it in one direction or the other; or if being driven by an overhauling load, may have torque developed in it to brake it, or stop it; and in any case, the direction of rotation of the load shaft may be determined or reversed, by adjusting the relative diameters of the pulleys 15—16, by the screw 27.

When the pulley diameters are adjusted, for example to make the pulley 15 larger than the pulley 16, to cause the shaft 22 to rotate slower than the shaft 18, power from the input gear 13 to the spider 3 divides, part flowing through the differential gear 6 to the gear 36, and to the output shaft 39; and part flowing through the differential gear 5, shaft 22, gears 20 and 19 to the pulley 15 and thence by the belt 17 to the pulley 16, and to the shaft 18, which is connected to the differential gear 9, and there reacting through the pinions 8 flows to the differential gear 10 and to the gear 37 and to the output shaft 39. When the shaft 18 is caused to rotate slower than the shaft 22 by adjusting the pulley 16 to be larger than the pulley 15, power from the input gear 13 is transmitted through the spider 3 to the spider 7 and there divides, part flowing through the differential gear 10 to the gear 37 and to the output shaft 39, and part through the differential gear 9, shaft 18, pulley 16, belt 17, pulley 15, and through the gears 19—20 to the shaft 22, and to the differential gear 5, and there, reacting upon the pinions 4 goes to the differential gear 6 and gear 36 and to the output shaft 39. When the pulley 15 is larger than the pulley 16, the output shaft 39 is driven in one direction, and when the pulley ratio is reversed it is driven in the other direction; and all of the power put in by the gear 13 goes to the output shaft 39, except that of incidental frictional losses, and this is true in both directions and at all speeds of the output element 39.

I am aware that the Reeves type of speed ratio changing device or transmission has heretofore been used in connection with differential gearing to control the relative speeds of two of the three elements of the gearing to thereby control the speed of the third element; but in such prior arrangements, there is an internal circulation of power through the belt connecting the variable diameter pulleys, and through the differential gearing, and this internal circulation of power is known to absorb a part of the input power and reduce the efficiency of the transmission. This internal circulation and absorption of power in such cases is greater for pulley ratios at which the output shaft rotates in one direction than for pulley ratios at which it rotates in the other direction. Such transmissions are therefore asymmetrical, transmitting more of the input power in one direction than in the other.

In the above described arrangement, there is no internal circulation of power in this belt and pulley transmission, all of the input power flowing to the output shaft in either of its directions of rotation, and at all speed ratios of the belt transmission.

Furthermore, with the above described arrangement, only a part of the power put in at the spiders 3 and 7 by the gear 13 is transmitted through the belt and pulley device 14. It can be demonstrated that even at the full rating of the drive, only 75% of the full load power goes through the belt. For example when ten horsepower is being transmitted to the load, only 7½ horsepower will be transmitted through the variable speed ratio device comprising pulleys 15 and 16 and the belt 17. The use of a smaller, cheaper and more efficient belt and pulley transmission is therefore made possible because of the double differential gearing arrangement with which it is associated, than is possible with such transmissions when associated with differential gearing as in prior practice.

The rotation of the screw 27 to change the speed ratio of the device 14 for the described purposes may be effected by various means to accomplish various load driving purposes and characteristics several of which means being shown in the drawing and either of which may be used optionally; and these will now be described.

The screw 27 has a hand wheel 40 on it at one end for turning it.

The other end of the screw 27 is connected to the spider 41 of a control differential gearing 42. The spider 41 rotatably supports pinions 43—43 meshed with differential gears 44—45. The differential gear 44 is connected by a shaft 46 to a gear 47 driven upon rotation of the output shaft 39, and preferably through an idler gear 48 between the gears 37 and 47.

The differential gear 45 is connected to a bevel gear 50 meshing with a bevel gear 51 on a shaft 52 to which is connected a hand wheel 53 for turning it.

The shaft 52 extends beyond the hand wheel 53 and has a clutch element 54 splined thereon for axial movement, effected by rocking movement of a pivoted manual lever 55.

A corresponding clutch element 56 is connected to the shaft 57 of a motor driven unit 58. This unit may be any one of the known or commercial units comprising a variable speed transmission 59, an output shaft 57, and a motor 60 for driving the shaft 57 through the transmission 59 and the transmission having adjustable means for varying and setting the speed of the output shaft 57 and for maintaining it constantly at the set speed, in the forward or reverse direction. The transmission 58 illustrated has a hand wheel for adjusting the speed and a dial and scale 62 for indicating the direction and speed for which it is set and a motor 60 for driving it.

Assuming that the load connected to the load shaft 39 is one whose speed and direction are to be controlled by hand, the clutch 54—56 is first disconnected by operating the lever 55. The hand wheel 40 is then turned, in one direction or the other, turning the screw 27 and this as described will cause the output shaft 39 to rotate in one direction or the other, and at a speed proportional to the number of revolutions given to the screw 27 and the corresponding angular extent to which the levers 23—24 are rocked. To stop the output shaft the screw 27 is rotated back to a neutral position by the hand wheel 40. The load can thus be driven in the forward or reverse direction and at a desired speed in either direction by rotation of the hand wheel 40.

During this hand control, the shaft 52 and hand wheel 53 will be rotated idly through the differential gearing 42, by rotation of the hand wheel 40 or by rotation of the load shaft 39 or both.

Again, if the load on the output shaft 39 is one which it is desired to drive accurately at a constant preselected speed, then the clutch 54—56 would be engaged by the lever 55 and the hand wheel 61 would be turned, to set the transmission 58 to drive its output shaft 57 at a set constant speed. It may be assumed for simplicity that at the time when the clutch 54—56 is engaged, the output shaft is at rest.

The transmission 58 now rotates the shaft 52, gears 50—51, and differential gear 45, the latter at a set speed. The other differential gear 44 is at rest and the gear 45 acting through the pinions 43—43 turns the spider 41 and the screw 27, thereby rocking the levers 23—24 to change the ratio of the device 14 and cause the output shaft 39 to turn. Rotation of the latter, acting through the idler 48 and gear 47 and shaft 46 turns the differential gear 44 in the direction opposite to the direction of the differential gear 45; and the increasing speed of the gear 44 brings it up to a speed equal to that of the differential gear 45 and thereupon the spider 41 stops rotating and stops rocking of the levers 23—24, and the output shaft 39 thereafter rotates at the speed which it has by this time attained.

If the output shaft 39 should, because of an increase of load thereon, tend to slow down, by reacting through the gearing and slowing down the motor 13, this will slow down rotation of the gear 44 and the gear 45 still rotating at its constant set speed will rotate the spider 41 and cause further rocking of the levers 23—24 to increase the speed of the load shaft and restore it to its preselected speed again. Any tendency of the load shaft to increase in speed is corrected by a similar response in the reverse sense when the gear 44 begins to rotate faster than the gear 45.

The speed of the output shaft can thus be set at a constant speed at any time by rotation of the hand wheel 61 to a corresponding position; and the control will automatically maintain that load speed.

During this control and automatic regulation of speed, the hand wheel 53 will rotate idly continuously; and the hand wheel 40 will rotate idly from time to time as regulating action goes on.

The motor driven transmission 58 may be of very small fractional horsepower, incapable itself of driving the load on the shaft 39, whereby the motor 12 and output shaft 39 and associated elements of the main differential gearing transmission may be of large size able to transmit very great horsepower, the unit 58 being a speed reference unit having only power enough to operate the screw 27.

Again, the output shaft 39 may be connected to a load which is to be moved to a desired position and left in that position. Illustrative of such uses is the positioning of airport wind direction signals or the aiming of guns by motor power. In such a case, the output shaft 39 is to be rotated preferably at high speed for a number of revolutions and then automatically slowed down and stopped. To effect this control the clutch 54—56 is disconnected and the hand wheel 53 is turned. This turns the differential gear 45 and through the pinions 43 turns the spider 41, and the screw 27 turns and this causes the shaft 39 to start and accelerate.

Rotation of the output shaft 39 turns differential gear 44 in the direction to neutralize the effect on the spider 41 of rotation of the differential gear 45. Thus so to speak the differential gear 44 tries to catch up with the differential gear 45. The faster the wheel 53 is turned the more will the speed of differential gear 45 stay ahead of the speed of differential gear 44 and keep the screw 27 turning and keep the speed-ratio of the device 14 departing more and more from a one-to-one ratio. There is a speed of rotation for the hand wheel 53 at which the screw 27 will finally become stationary and cause the output shaft 39 to have a corresponding speed. If rotation of the wheel 53 is slowed down below that speed or is stopped altogether, then the speed of the differential gear 44 will catch up with and pass beyond that of the differential gear 45, and turn the screw 27 in the other direction, causing the output shaft 39 to slow down and when the device 14 has in this manner been brought to a one-to-one ratio, the load shaft 39 will stop.

During this control, the hand wheel 40 rotates idly.

In the case of control by the hand wheels 53 or 40 as described, the load whether it is an overhauling load, as when the load shaft 39 drives a hoist cable drum, or whether it is one moving with inertia, improved dynamic braking may be had by the transmission.

Heretofore dynamic braking has been effected by causing the power input motor itself to act as an electric generator driven by the load. Such prior dynamic braking is highly effective (although requiring complications of electric circuits and contacts to control them) but only at high speeds of the load. As the load is slowed down, the generator is driven more slowly and generates decreasing electric power and decreasing brake torque; and is therefore less effective at low load speeds and become wholly ineffective as the load approaches zero speed, and to stop and hold the load, a supplemental friction brake has had to be added.

In the present invention, to quickly brake and stop an overhauling load or an inertia load, the screw 27 may be rotated to rock the levers 23—24 to give a speed ratio for the device 14 at which the direction of the applied torque on the output shaft is reversed. This brakes the load and as it slows down and approaches rest, the screw 27 may be returned toward its rotary position of one-to-one ratio and arrive there when the load comes to rest (if it be an inertia load) or stop short of that position so as to maintain a load holding torque (if it be an overhauling load). As much torque as desired may thus be applied to brake the load, from high speed all the way to zero speed, and in fact, if the braking torque thus developed is not removed by return rotation of the screw 27 when the load is braked to rest, it will immediately be reversed under full power and torque, and this latter action which is sometimes wanted corresponds to the action obtained with conventional motor controls and then known as "plugging" the motor.

No elements additional to those described above for power driven loads are required to provide this improved dynamic braking and "plugging" action.

Still another type of control may be effected by the hand wheel 53 with the clutch 54—56 disengaged. Assuming for simplicity that the load is at the time at rest and that the differential gear 44 is at rest, upon turning the hand wheel 53, the differential gear 45 turns and rotates the spider 41 and the screw 27.

This starts and accelerates the load shaft 39 as described; and the differential gear 44 begins to rotate and accelerate. The hand wheel 53 may be turned at a sufficiently high speed so as to cause the screw to be turned a number of revolutions before the differential gear 44 "catches up" with the differential gear 45 so that the output shaft may be caused to attain a desired speed. If now the hand wheel 53 be released, the screw 27 will stay in its moved position corresponding to the desired speed of the output shaft, and the rotating differential gear 44 will rotate the differential gear 45, and, through gears 50—51 will cause the hand wheel 53 to continue to rotate, idly. The output shaft will therefore continue to be driven at its desired speed.

To bring the load to rest, the hand wheel 53 may be grasped and its rotation stopped. The rotating gear 44 will then rotate the spider 41 and screw 27 to restore the one-to-one ratio in the transmission device 14, at which the output shaft will come to rest.

If, instead of merely stopping the hand wheel 53, it be rotated in the opposite direction, the screw 27 will be rotated more rapidly to stop the load more quickly, or if the hand wheel 53 be turned fast enough and far enough in the said opposite direction, the output shaft will be stopped by the above described "plugging" action, as will be understood.

Any one of the several controls herein described may be used alone; or any of them in combination with another; the reason for illustrating and describing all of them in one assembly being to simplify the drawing which otherwise would require numerous additional figures. The above described controls include some in which, with the clutch 54—56 disengaged, the screw 27 remains at rest and the shaft 52 rotates idly, although both are connected to and receive torque from the gearing 42. This results from the fact that the screw requires considerable torque to turn it because of the friction of the nuts 25—26 threaded thereon, amplified by the axially directed pressure on the nuts from the levers 23—24 tending to rock toward positions corresponding to one-to-one ratio of the pulleys 15—16, additionally to the small friction in the bearings supporting it (not shown) whereas to turn the shaft 52 only enough torque is required to overcome the friction of its supporting bearings.

It will be observed that the power of the motor 12 is put into the two differential gearings 1 and 2 at their spiders 3—7, and taken out and applied to the output shaft 39 from two differential gears 6—10 of the gearings, and the output shaft speed controlled by controlling the relative speeds of the other two differential gears 5—9 of the gearings, by a variable speed-ratio transmission device, connected between shafts 22—18, to which the differential gears 5—9 are connected.

In the above identified parent application from which this application is divisional, double differential gearings are illustrated and described having two shafts R1 and R2 corresponding to the shafts 22—18 of this application, but electrical means are provided to control the relative speeds of the shafts R1—R2. And in said parent application modifications are shown including a modification in which the shafts R1 and R2 are connected to differential gears of the respective gearings, but power is put in at differential gears and taken out at the spiders; and a modification in which the shafts R1 and R2 are connected to the spiders, and power is put in at differential gears and taken out at differential gears.

It is believed that, to provide modifications of the present application, if desired for any reason, those skilled in the art will understand, without further illustration or description herein, how to connect the variable speed-ratio transmission device of this application between the shafts R1 and R2 of said parent application, instead of between the shafts 22 and 18 of this application.

I claim:

1. A power transmission comprising a power output element; a pair of differential gearings each gearing comprising three elements, namely, a rotatable spider element rotatably supporting a pinion, and two rotatable gears meshed with the pinion; an element of each gearing being arranged to be constantly driven by power; a second element of each gearing being connected to the output element; control means to control the speeds of the third elements to cause the second elements to apply torques to the output element and to balance and unbalance the torques, and to cause the output element to have zero speed when the said torques are balanced by balanced speeds of the third elements, and to rotate in forward or reverse direction when the said torques are correspondingly unbalanced by unbalanced speeds; said control means comprising variable diameter pulleys connected to rotate with the third elements respectively, and connected to each other by a belt, and means to increase the diameter of one pulley and decrease that of the other.

2. A power transmission comprising a power output element; a pair of differential gearings each gearing comprising three elements, namely, a rotatable spider element rotatably supporting a pinion, and two rotatable gears meshed with the pinion; an element of each gearing being arranged to be constantly driven by power; a second element of each gearing being connected to the output element; control means to control and vary the relative speeds of the third elements to cause the second elements have different relative speeds to cause the output element to have different speeds accordingly; said control means comprising variable diameter pulleys connected to rotate with the third elements respectively, and connected to each other by a belt, and means to change the relative diameters of the pulleys.

3. In a power transmission mechanism, a pair of differential gearings each comprising three elements namely: a spider element rotatably supporting a pinion and a pair of differential gears meshed with the pinion; an element of each gearing adapted to be driven by a continuously running motor; a rotary output element; another element of each gearing drivingly connected to the output element; a power transmission device comprising two rotary elements and means connecting them constraining them to rotate at a predetermined speed ratio and operable adjustable means to adjustably vary the predetermined speed ratio; and the third elements of the gearings drivingly connected respectively each to one of the rotary elements of the variable speed ratio device; the operable adjusting means comprising a rotary adjusting element rotatable in one direction to increase the speed ratio of the device and in the other direction to decrease it; a control differential gearing comprising three elements namely a spider element rotatably supporting a pinion and two differential gears meshed with the pinion; an operator's handle connected to one element of the control gearing to rotate it in either direction, another element of the control gearing drivingly connected to the rotary adjusting element, and the third element of the control gearing drivingly connected to the rotary output element and driven thereby.

4. In a power transmission mechanism, a pair of differential gearings each comprising three elements namely: a spider element rotatably supporting a pinion and a pair of differential gears meshed with the pinion; an element of each gearing adapted to be driven by a continuously running motor; a rotary output element; another element of each gearing drivingly connected to the output element; a power transmission device comprising two rotary elements and means connecting them constraining them to rotate at a predetermined speed ratio and operable adjustable means to adjustably vary the predetermined speed ratio; and the third elements of the gearings drivingly connected respectively each to one of the rotary elements of the variable speed ratio device; the operable adjusting means comprising a rotatable adjusting element rotatable in alternate directions, and mechanism operable thereby to correspondingly alternately increase and decrease the speed ratio of the device; a control differential gearing comprising three elements namely a spider element rotatably supporting a pinion and two differential gears meshed with the pinion; a driven speed reference rotary element drivingly connected to one element of the control gearing to rotate it, another element of the control gearing drivingly connected to the rotatable adjusting element, and the third element of the control gearing drivingly connected to the rotary output element and driven thereby; a constant speed control motor; a variable speed ratio control transmission between the control motor and the driven speed reference rotary element; and adjusting means for adjustably varying the speed ratio of the control transmission.

5. In a power transmission mechanism, a pair of differential gearings each comprising three elements namely: a spider element rotatably supporting a pinion and a pair of differential gears meshed with the pinion; an element of each gearing adapted to be driven by a continuously running motor; a single rotary output element; another element of each gearing both drivingly connected to the output element; a power transmission device comprising two rotary elements and means connecting them constraining them to rotate at a predetermined speed ratio and the third elements of the gearings drivingly connected respectively each to one of the rotary elements of the variable speed ratio device; and operable adjusting means to selectively vary the predetermined speed ratio to cause the output element to rotate in the forward or reverse direction at selected speeds or to be at rest; said operable adjusting means comprising a rotary element rotatable in alternate directions, an an operator's handle for so rotating it, and mechanism operable thereby to correspondingly alternately increase and decrease the speed ratio of the device.

LEV A. TROFIMOV.

References Cited in the file of this patent

UNITED STATES PATENTS

| Number | Name | Date |
|---|---|---|
| 1,984,830 | Higley | Dec. 18, 1934 |
| 1,984,831 | Higley | Dec. 18, 1934 |
| 2,117,340 | Maurer | May 17, 1938 |
| 2,220,983 | Waters | Nov. 12, 1940 |
| 2,354,204 | Gentry | July 25, 1944 |
| 2,384,776 | Trofimov | Sept. 11, 1945 |
| 2,464,275 | Trofimov | Mar. 18, 1949 |